United States Patent
Pratt et al.

(10) Patent No.: US 10,147,204 B2
(45) Date of Patent: Dec. 4, 2018

(54) CREATING PLATFORM POSITIONING MAPS REPRESENTING SURFACE PAD LOCATION FEASIBILITY

(71) Applicant: Landmark Graphics Corporation, Houston, TX (US)

(72) Inventors: DeWayne Pratt, Littleton, CO (US); Richard Daniel Colvin, Dripping Springs, TX (US); Robello Samuel, Cypress, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 14/902,287

(22) PCT Filed: Jan. 5, 2015

(86) PCT No.: PCT/US2015/010141
§ 371 (c)(1),
(2) Date: Dec. 30, 2015

(87) PCT Pub. No.: WO2016/111669
PCT Pub. Date: Jul. 14, 2016

(65) Prior Publication Data
US 2018/0122102 A1    May 3, 2018

(51) Int. Cl.
*G06T 11/00* (2006.01)
*G06F 17/50* (2006.01)
*E21B 43/30* (2006.01)
*G06T 7/11* (2017.01)

(52) U.S. Cl.
CPC .......... *G06T 11/001* (2013.01); *E21B 43/305* (2013.01); *G06T 7/11* (2017.01)

(58) Field of Classification Search
CPC ........ G06T 11/001; G06Q 50/02; G01V 1/30; G01V 1/40; G01V 2210/61; E21B 43/30; E21B 43/305; G06F 17/50; G06F 17/5004
See application file for complete search history.

(56) References Cited

U.S. PATENT DOCUMENTS

| | | | |
|---|---|---|---|
| 7,596,481 B2 | 9/2009 | Zamora et al. | 703/10 |
| 8,073,664 B2 * | 12/2011 | Schottle et al. | E21B 7/06 703/10 |
| 9,091,145 B2 * | 7/2015 | Colvin et al. | E21B 41/0092 |
| 2004/0153299 A1 | 8/2004 | Colvin et al. | 703/10 |
| 2011/0153300 A1 | 6/2011 | Holl et al. | 703/10 |
| 2013/0073209 A1 | 3/2013 | Colvin et al. | G06F 19/00 |
| 2013/0231901 A1 | 9/2013 | Lu et al. | E21B 43/30 |
| 2015/0331971 A1 * | 11/2015 | Scollard et al. | G06F 17/5004 703/1 |

OTHER PUBLICATIONS

International Search Report and Written Opinion; PCT Application No. PCT/US2015/010141; dated Sep. 30, 2015.

* cited by examiner

*Primary Examiner* — Andrew W Johns
(74) *Attorney, Agent, or Firm* — Polsinelli PC (57) ABSTRACT

Systems and methods for creating platform positioning maps representing surface pad location feasibility for visually validating a current surface pad location and/or determining the suitability of another surface pad location.

20 Claims, 4 Drawing Sheets

CREATING PLATFORM POSITIONING MAPS REPRESENTING SURFACE PAD LOCATION FEASIBILITY

CROSS-REFERENCE TO RELATED APPLICATIONS

This application claims the priority of PCT Patent Application No. PCT/US15/10141, filed on Jan. 5, 2015, which is incorporated herein by reference. This application and U.S. Pat. No. 8,073,664 and U.S. patent application Ser. No. 14/389,729, which are incorporated herein by reference, are commonly assigned to Landmark Graphics Corporation.

STATEMENT REGARDING FEDERALLY SPONSORED RESEARCH

Not applicable.

FIELD OF THE DISCLOSURE

The present disclosure generally relates to systems and methods for creating platform positioning maps representing surface pad location feasibility. More particularly, the present disclosure relates to creating platform positioning maps representing surface pad location feasibility for visually validating a current surface pad location and/or determining the suitability of another surface pad location.

BACKGROUND

Often, when considering a wells surface location, sometimes referred to as pads or a platform, the need for a location to be manually adjusted to a more optimal location is often recognized but difficult to visualize. Further, more than any other type of well, horizontal wells, sometimes referred to as laterals, need to be planned at the reservoir level with knowledge of where the surface pad will be located. Likewise, the location and spacing of the horizontal wells must be taken into account when planning the positions of these surface pads. In addition to the well positions, spacing, length and the like, boundaries and hazards must also be taken into account when positioning the surface pads. Hazards can come in the form of subsurface hazards such as faults or shallow gas, or surface hazards such as roads, buildings, bodies of water, pipelines, railroads, environmentally sensitive areas and the like. In addition to surface hazards, the terrain itself is not always conducive to drilling. It might be too high, or contain too much slope so that the site preparation becomes too expensive.

Once an optimal surface pad location is determined using conventional techniques such as, for example, automated platform positioning techniques, the current surface pad location may need to be validated and/or the suitability of another surface pad location may need to be determined for various reasons. Under such circumstances, it is often difficult to understand the basis for current surface pad location compared to other potential locations, particularly when it was determined using an automated platform-positioning technique, and it is manually intensive and time consuming to determine whether other potential locations are suitable.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

The present disclosure overcomes one or more deficiencies in the prior art by providing systems and methods for creating platform positioning maps representing surface pad location feasibility for visually validating a current surface pad location and/or determining the suitability of another surface pad location.

In one embodiment, the present disclosure includes a method of creating a platform positioning map for validating a current surface pad location and determining the suitability of another surface pad location, which comprises: i) determining a position for each pixel in an area of interest; ii) determining if each pixel position is valid; iii) assigning one of a first color and a first grey-scale shade to each pixel subject to an invalid pixel position, the first color and the first grey-scale shade representing an invalid position for a surface pad location where drilling cannot be conducted without at least one of a surface constraint and a subsurface constraint; iv) calculating a value for each pixel with a valid pixel position using a computer processor; v) assigning one of a second color and a second grey-scale shade to each pixel subject to the respective value, the second color and the second grey-scale shade representing at least (1) lateral well but less than a full set of lateral wells can be planned from a valid pixel position for a surface pad location'; and vi) assigning one of a third color and a third grey-scale shade to each pixel subject to the respective value, the third color and the third grey-scale shade representing a full set of lateral wells can be planned from a valid pixel position for a surface pad location.

In another embodiment, the present disclosure includes a non-transitory program carrier device tangibly carrying computer-executable instructions for creating a platform positioning map for validating a current surface pad location and determining the suitability of another surface pad location, which comprises: i) determining a position for each pixel in an area of interest; ii) determining if each pixel position is valid; iii) assigning one of a first color and a first grey-scale shade to each pixel subject to an invalid pixel position, the first color and the first grey-scale shade representing an invalid position for a surface pad location where drilling cannot be conducted without at least one of a surface constraint and a subsurface constraint; iv) calculating a value for each pixel with a valid pixel position; v) assigning one of a second color and a second grey-scale shade to each pixel subject to the respective value, the second color and the second grey-scale shade representing at least (1) lateral well but less than a full set of lateral wells can be planned from a valid pixel position for a surface pad location'; and vi) assigning one of a third color and a third grey-scale shade to each pixel subject to the respective value, the third color and the third grey-scale shade representing a full set of lateral wells can be planned from a valid pixel position for a surface pad location.

In yet another embodiment, the present disclosure includes a non-transitory program carrier device tangibly carrying computer-executable instructions for creating a platform positioning map for validating a current surface pad location and determining the suitability of another surface pad location, the instructions being executable to implement: i) determining a position for each pixel in an area of interest; ii) assigning one of a first color and a first grey-scale shade to each pixel subject to an invalid pixel position, the first color and the first grey-scale shade representing an invalid position for a surface pad location where drilling cannot be conducted without at least one of a surface constraint and a subsurface constraint; iii) calculating a value for each pixel with a valid pixel position; iv) assigning one of a second color and a second grey-scale shade to each pixel subject to the respective value, the second color and the second grey-scale shade representing at least (1) lateral well but less than a full set of lateral wells can be planned from a valid pixel position for a surface pad location; v) assigning one of a third color and a third grey-scale shade to each pixel subject to the respective value, the third color and the third grey-scale shade representing a full set of lateral wells can be planned from a valid pixel position for a surface pad location; and vi) displaying each pixel in the area of interest.

The subject matter of the present disclosure is described with specificity; however, the description itself is not intended to limit the scope of the disclosure. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries to achieve similar results.

Method Description

The methods described herein for implementing the disclosure may consider different surface constraints, restrictions and parameters in creating the platform positioning map such as, for example, cost and/or risk factors. In considering cost, for example, the methods may take into account where different costs are associated with different pre-construction activities, thus enabling a surface pad to be repositioned to a more cost effective location. The methods may also take into account the financial impact of construction to a planned location, based on distance and cost to connect to the existing infrastructure. And, the platform positioning map may be created on the fly (in real-time) in the manner described herein and displayed in different ways to visually convey surface pad location feasibility.

Figure 1:
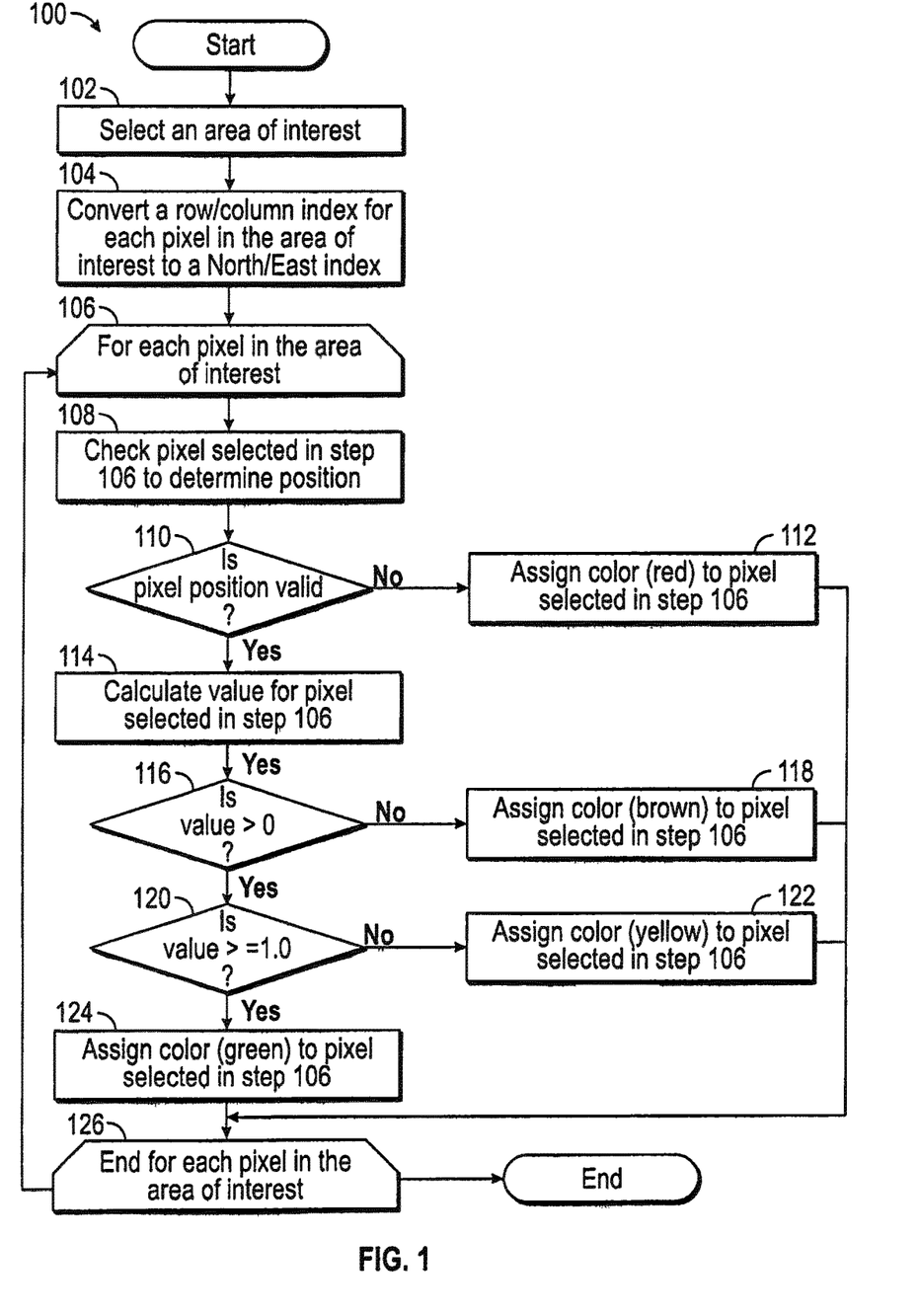
FIG. 1 is a flow diagram illustrating one embodiment of a method for implementing the present disclosure.

Referring now to FIG. 1, a flow diagram of one embodiment of a method 100 for implementing the present disclosure is illustrated.

Figure 5:
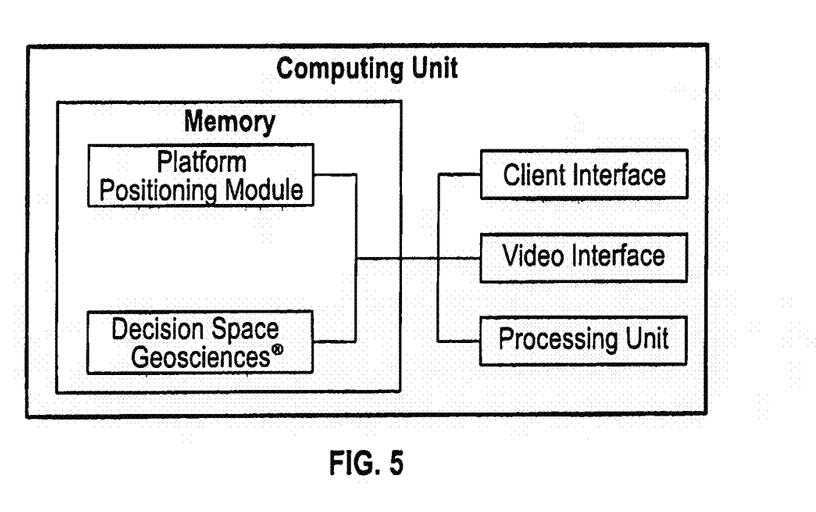
FIG. 5 is a block diagram illustrating one embodiment of a computer system for implementing the present disclosure.

In step 102, an area of interest is automatically selected or may be selected using the client interface and/or the video interface described further in reference to FIG. 5. The area of interest may be any polygonal shape or a point and radius (circle) that represents an area where a surface pad may be located. The area of interest also includes a plurality of pixels therein that will represent a raster image of the platform positioning map.

In step 104, a row/column index for each pixel in the area of interest is converted to a North/East index using techniques well known in the art.

In step 106, the method 100 selects a pixel in the area of interest for steps 108-124. The method 100 may select a pixel at random or using any other predetermined criteria.

In step 108, the pixel selected in step 106 is checked to determine its position.

In step 110, the method 100 determines if the pixel position determined in step 108 is valid using techniques well known in the art. A pixel position is valid if its position represents a potentially available location for a surface pad in the area of interest where drilling may be conducted free of any surface and/or subsurface constraints (e.g. hazards). If the pixel position is valid, then the method 100 proceeds to step 114. Otherwise, the method 100 proceeds to step 112.

In step 112, the pixel selected in step 106 is assigned a color, such as red, to represent an invalid position for the surface pad location. Alternatively, the pixel selected in step 106 may be assigned a shade using a grey-scale to represent an invalid position for the surface pad location. The method 100 then proceeds to step 126.

In step 114, a value is calculated for the pixel selected in step 106 using techniques well known in the art to determine the value based upon the number of wells, which may be horizontal (i. e. lateral) or deviated, that can be planned from the surface pad at that pixel position. If, for example, a surface pad is placed at a valid position and there is no reservoir accessible from it, then it is effectively worthless. In this case, the pixel value would be 0. If, however, there is an accessible reservoir from the valid position for the surface pad, but the full capacity of the surface pad cannot be utilized at that position, then the pixel value may be greater than 0 but less than 1. In the event that there is an accessible reservoir from the valid position and the full capacity of the surface pad can be utilized at that position (i.e. an optimal or full set of lateral wells can be planned from that position), then the pixel value would be greater than or equal to 1. Alternatively, the value may be calculated for the pixel selected in step 106 using techniques well known in the art to determine the value based upon some other set of surface and/or subsurface constraints, restrictions and parameters associated with cost and/or risk factors.

In step 116, the method 100 determines if the value calculated in step 114 is greater than 0. If the value is greater than 0, then lateral wells can be planned and the method 100 proceeds to step 120. Otherwise, lateral wells cannot be planned and the method 100 proceeds to step 118.

In step 118, the pixel selected in step 106 is assigned a color, such as brown, to represent that no lateral wells can be planned from that position for the surface pad location. Alternatively, the pixel selected in step 106 may be assigned a shade using a grey-scale to represent that no lateral wells can be planned from that position for the surface pad location. The method 100 then proceeds to step 126.

In step 120, the method 100 determines if the value calculated in step 114 is greater than or equal to 1. If the value is greater than or equal to 1, then an optimal or full set of lateral wells can be planned and the method 100 proceeds to step 124. Otherwise, less than an optimal or full set of lateral wells can be planned and the method 100 proceeds to step 122.

In step 122, the pixel selected in step 106 is assigned a color, such as yellow, to represent that less than an optimal or full set of lateral wells can be planned from that position for the surface pad location. Alternatively, the pixel selected in step 106 may be assigned a shade using a grey-scale to represent that less than an optimal or full set of lateral wells can be planned from that position for the surface pad location. The method 100 then proceeds to step 126.

In step 124, the pixel selected in step 106 is assigned a color, such as green, to represent that an optimal or full set of lateral wells can be planned from that position for the surface pad location. Alternatively, the pixel selected in step 106 may be assigned a shade using a grey-scale to represent that an optimal or full set of lateral wells can be planned from that position for the surface pad location. The method 100 then proceeds to step 126.

In step 126, the method 100 determines if additional pixels are available from step 104 that were not selected in step 106. If there are additional pixels available from step 104 that were not selected in step 106, then the method 100 returns to step 106 to select another pixel. Otherwise, the method 100 ends.

Figure 2A:
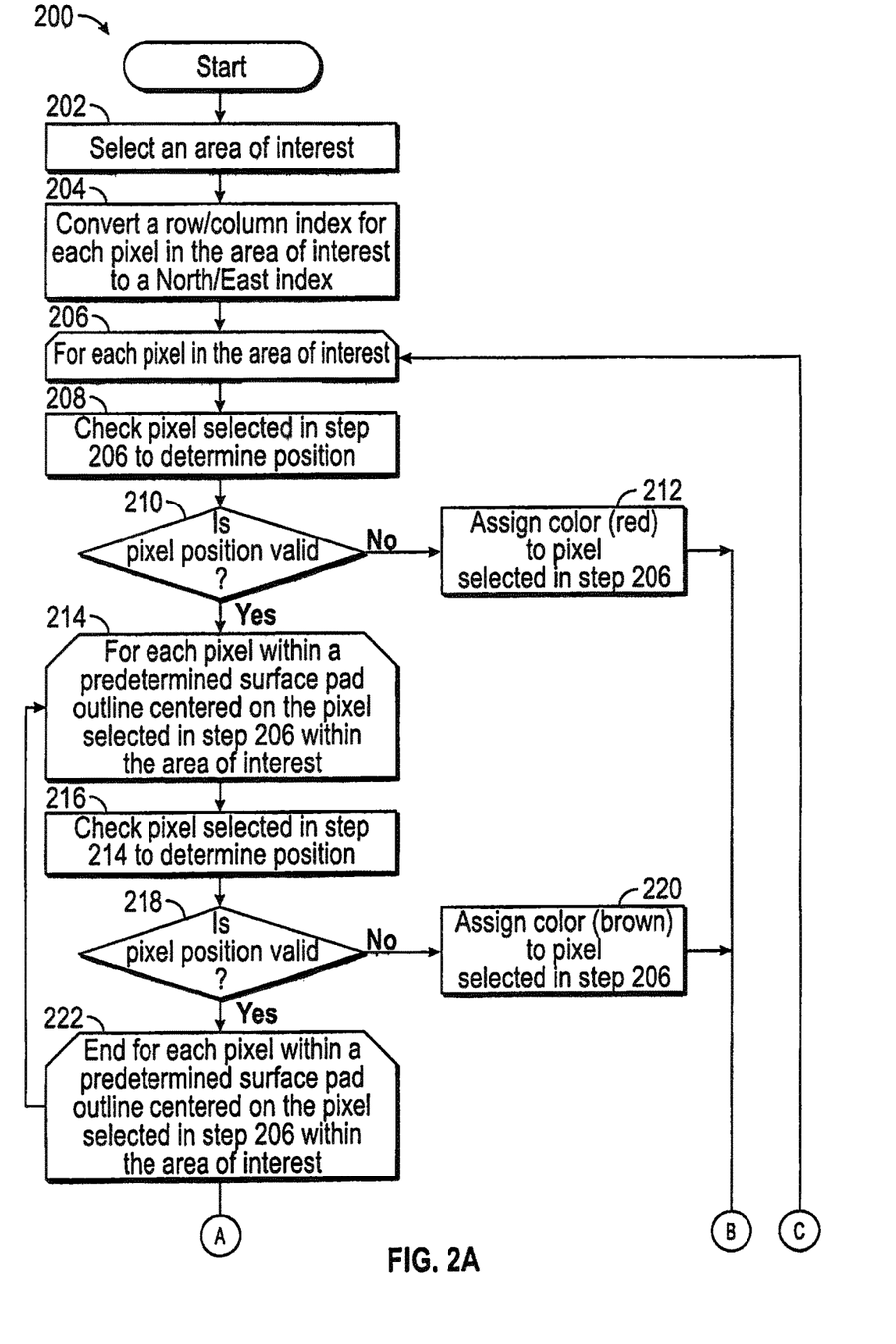
FIGS. 2A-2B are a flow diagram illustrating another embodiment of a method for implementing the present disclosure.
Figure 2B:
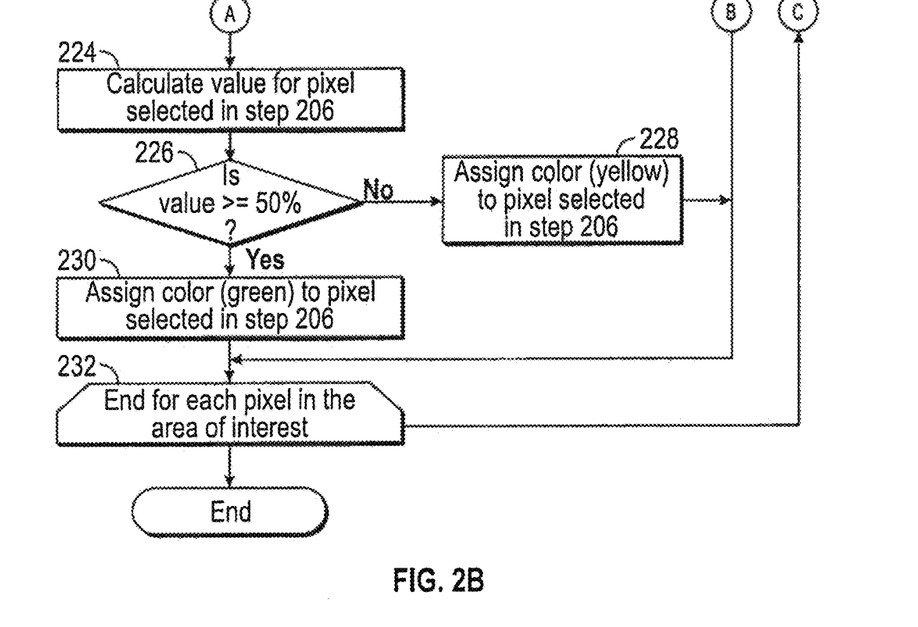

Referring now to FIGS. 2A-2B, a flow diagram of another embodiment of a method 200 for implementing the present disclosure is illustrated.

In step 202, an area of interest is automatically selected or may be selected using the client interface and/or the video interface described further in reference to FIG. 5. The area of interest may be any polygonal shape or a point and radius (circle) that represents an area where a surface pad may be located. The area of interest also includes a plurality of pixels therein that will represent a raster image of the platform positioning map.

In step 204, a row/column index for each pixel in the area of interest is converted to a North/East index using techniques well known in the art.

In step 206, the method 200 selects a pixel in the area of interest for steps 208-230. The method 200 may select a pixel at random or using any other predetermined criteria.

In step 208, the pixel selected in step 206 is checked to determine its position.

In step 210, the method 200 determines if the pixel position determined in step 208 is valid using techniques well known in the art. A pixel position is valid if its position represents a potentially available location for a surface pad in the area of interest where drilling may be conducted free of any surface and/or subsurface constraints (e.g. hazards). If the pixel position is valid, then the method 200 proceeds to step 214. Otherwise, the method 200 proceeds to step 212.

In step 212, the pixel selected in step 206 is assigned a color, such as red, to represent an invalid position for the surface pad location. Alternatively, the pixel selected in step 206 may be assigned a shade using a grey-scale to represent an invalid position for the surface pad location. The method 200 then proceeds to step 232.

In step 214, the method 200 selects another pixel within a predetermined surface pad outline that is centered on the pixel selected in step 206 and within the area of interest for steps 216-220. The method 200 may select another pixel at random or using any other predetermined criteria. The predetermined surface pad outline is based on the size and shape of the entire surface pad facilities such that it not only includes the surface pad but also the full drilling site surrounding the surface pad within the area of interest.

In step 216, the pixel selected in step 214 is checked to determine its position.

In step 218, the method 200 determines if the pixel position determined in step 216 is valid using techniques well known in the art. A pixel position is valid if its position represents a potentially available location for a surface pad in the area of interest where drilling may be conducted free of any surface and/or subsurface constraints (e.g. hazards). If the pixel position is valid, then the method 200 proceeds to step 222. Otherwise, the method 200 proceeds to step 220.

In step 220, the pixel selected in step 206 is assigned a color, such as brown, to represent that the predetermined surface pad outline cannot be centered on this pixel position. Alternatively, the pixel selected in step 206 may be assigned a shade using a grey-scale to represent that the predetermined surface pad outline cannot be centered on this pixel position. The method 200 then proceeds to step 232.

In step 222, the method 200 determines if additional pixels lie within the predetermined surface pad outline that were not selected in step 214. If there are additional pixels that lie within the predetermined surface pad outline and were not selected in step 214, then the method 200 returns to step 214 to select another pixel. Otherwise, the method 100 proceeds to step 224. Alternatively, steps 214-222 may be replaced with the use of 2 bitmaps (e.g. matrices of true/false values) to look-up and confirm that each pixel position is valid for each pixel within a predetermined surface pad outline centered on the pixel selected in step 206 within the area of interest. For example, one bitmap may represent the predetermined surface pad outline superimposed with every pixel in the outline designated true and every pixel outside the outline designated false. The other bitmap may represent the area of interest superimposed with each pixel in it designated true if that particular pixel position is valid. When a particular pixel position needed to be validated, its (relative) position within the outline bitmap could be determined and, if valid, its value returned at the pixel position in the area of interest bitmap. If, however, the pixel position in the outline bitmap is invalid, then its value may be returned at the pixel position in the area of interest bitmap, since that position is not in the outline bitmap and therefore, doesn't matter whether it is valid.

In step 224, a value is calculated for the pixel selected in step 206 using techniques well known in the art to determine the value based upon the number of wells, which may be horizontal (i. e. lateral) or deviated, that can be planned from the surface pad at that pixel position. If, for example, a surface pad is placed at a valid position near an accessible reservoir and less than half of an optimal or full set of lateral wells can be planned from that position, then the pixel value would be <50%. If, however, a surface pad is placed at a valid position near an accessible reservoir and at least half of an optimal or full set of lateral wells can be planned from that position, then the pixel value would be >=50%. Alternatively, the value may be calculated for the pixel selected in step 206 using techniques well known in the art to determine the value based upon some other set of surface and/or subsurface constraints, restrictions and parameters associated with cost and/or risk factors.

In step 226, the method 200 determines if the value calculated in step 224 is greater than or equal to 50%. If the value is greater than or equal to 50%, then at least half of an optimal or full set of lateral wells can be planned and the method 200 proceeds to step 230. Otherwise, less than half of an optimal or full set of lateral wells can be planned and the method 200 proceeds to step 228.

In step 228, the pixel selected in step 206 is assigned a color, such as yellow, to represent that less than half of an optimal or full set of lateral wells can be planned from that position for the surface pad location. Alternatively, the pixel selected in step 206 may be assigned a shade using a grey-scale to represent that less than half of an optimal or full set of lateral wells can be planned from that position for the surface pad location. The method 200 then proceeds to step 232.

In step 230, the pixel selected in step 206 is assigned a color, such as green, to represent that at least half of an optimal or full set of lateral wells can be planned from that position for the surface pad location. Alternatively, the pixel selected in step 206 may be assigned a shade using a grey-scale to represent that at least half of an optimal or full set of lateral wells can be planned from that position for the surface pad location. The method 200 then proceeds to step 232.

In step 232, the method 200 determines if additional pixels are available from step 204 that were not selected in step 206. If there are additional pixels available from step 204 that were not selected in step 206, then the method 200 returns to step 206 to select another pixel. Otherwise, the method 200 ends.

Figure 3:
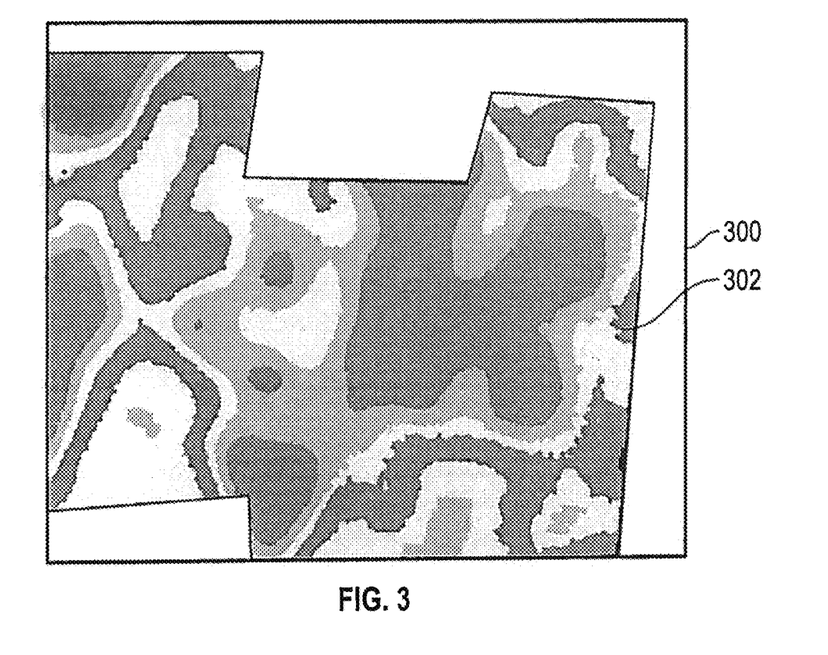
FIG. 3 is a graphical display illustrating a platform positioning map created according to the methods in FIG. 1 or 2A-2B.
Figure 4:
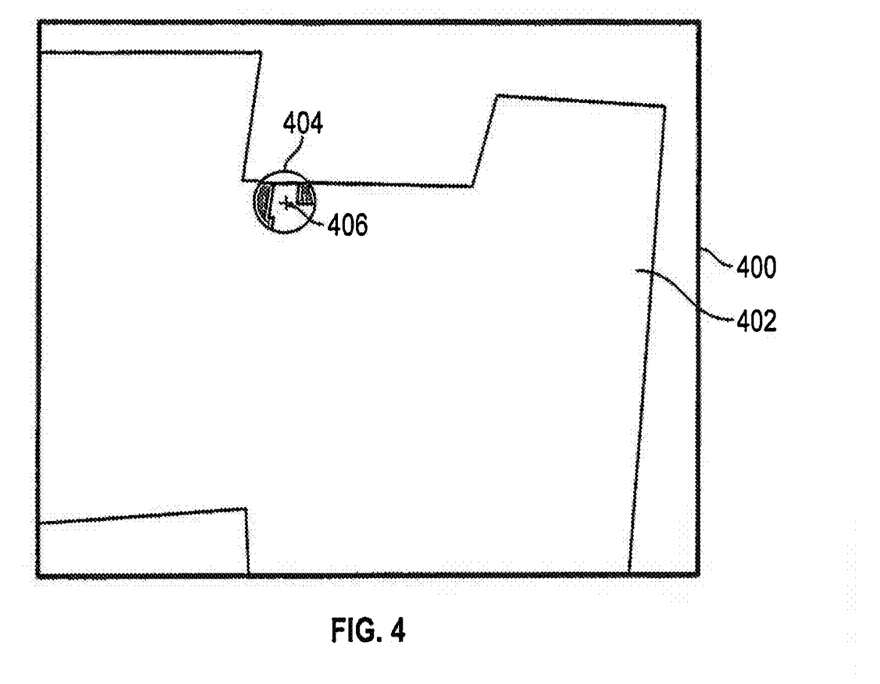
FIG. 4 is a graphical display illustrating another platform positioning map created according to the methods in FIG. 1 or 2A-2B.

Referring now to FIGS. 3-4, graphical displays 300, 400 of platform positioning maps created according to the methods in FIG. 1 or 2 are illustrated. As illustrated in FIG. 3, each pixel in the selected area of interest 302 defining a platform positioning map is visible and is assigned a respective grey-scale shade according to the methods in FIG. 1 or 2. Alternatively, each pixel in the selected area of interest 302 defining a platform positioning map is assigned a respective grey-scale shade according to the methods in FIG. 1 or 2, however, may not be visible as illustrated in FIG. 4. In FIG. 4, each pixel in the selected area of interest 402 defining a platform positioning map is assigned a respective grey-scale shade according to the methods in FIG. 1 or 2, however, is only visible within a predetermined area 404 of the cursor 406. In this manner, extraneous information in the platform positioning map outside the predetermined area 404 is not a distraction. The cursor 406 may therefore, be moved interactively using the client interface and/or the video interface described further in reference to FIG. 5 anywhere in the area of interest 402 and each pixel in the predetermined area 404 will be visibly displayed in real-time. In either platform positioning map, the color or shading of each pixel is associated with a respective level of cost and/or risk for a surface pad located at that pixel position. If the pixel is green or red, for example, the associated level of cost and/or risk for a surface pad located at that pixel position may be low (green) or high (red).

A platform positioning map thus, may be effectively used to represent surface pad location feasibility for visually validating a current surface pad location and/or determining the suitability of another surface pad location.

System Description

The present disclosure may be implemented through a computer-executable program of instructions, such as program modules, generally referred to as software applications or application programs executed by a computer. The software may include, for example, routines, programs, objects, components, data structures, etc., that perform particular tasks or implement particular abstract data types. The software forms an interface to allow a computer to react according to a source of input. DecisionSpace® Geosciences, which is a commercial software application marketed by Landmark Graphics Corporation, may be used as an interface application to implement the present disclosure. The software may also cooperate with other code segments to initiate a variety of tasks in response to data received in conjunction with the source of the received data. Other code segments may provide optimization components including, but not limited to, neural networks, earth modeling, history-matching, optimization, visualization, data management, reservoir simulation and economics. The software may be stored and/or carried on any variety of memory such as CD-ROM, magnetic disk, bubble memory and semiconductor memory (e.g., various types of RAM or ROM). Furthermore, the software and its results may be transmitted over a variety of carrier media such as optical fiber, metallic wire, and/or through any of a variety of networks, such as the Internet.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 5, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1-4. The memory therefore, includes a platform positioning module, which enables steps 110, 114, 210, 218 and 224 in FIGS. 1-2. The platform positioning module may integrate functionality from the remaining application programs illustrated in FIG. 5. In particular, DecisionSpace® Geosciences may be used as an interface application to perform the remaining steps in FIGS. 1-2. Although DecisionSpace® Geosciences may be used as an interface application, other interface applications may be used, instead, or the platform positioning module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/non-removable, volatile/nonvolatile computer storage media or they may be implemented in the computing unit through an application program interface ("API") or cloud computing, which may reside on a separate computing unit connected through a computer system or network. For example only, a hard disk drive may read from or write to non-removable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, voice recognition or gesture recognition, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method of creating a platform positioning map for validating a current surface pad location and determining the suitability of another surface pad location, which comprises:
    determining a position for each pixel in an area of interest;
    determining if each pixel position is valid;
    assigning one of a first color and a first grey-scale shade to each pixel subject to an invalid pixel position, the first color and the first grey-scale shade representing an invalid position for a surface pad location where drilling cannot be conducted without at least one of a surface constraint and a subsurface constraint;
    calculating a value for each pixel with a valid pixel position using a computer processor;
    assigning one of a second color and a second grey-scale shade to each pixel subject to the respective value, the second color and the second grey-scale shade representing at least (1) lateral well but less than a full set of lateral wells can be planned from a valid pixel position for a surface pad location; and
    assigning one of a third color and a third grey-scale shade to each pixel subject to the respective value, the third color and the third grey-scale shade representing a full set of lateral wells can be planned from a valid pixel position for a surface pad location.

2. The method of claim 1, further comprising:
    displaying each pixel in the area of interest; and
    validating a current surface pad location using the display of each pixel.

3. The method of claim 1, further comprising:
    displaying each pixel in the area of interest; and
    determining a suitability of another surface pad location using the display of each pixel.

4. The method of claim 1, wherein the value for each pixel assigned the one of a third color and a third grey-scale shade is one of at least (1) and at least 50%.

5. The method of claim 1, wherein the value for each pixel assigned the one of a second color and a second grey-scale shade is one of less than (1) and less than 50%.

6. The method of claim 5, wherein the value for each pixel assigned the one of a second color and a second grey-scale shade is less than 50%, and the second color and the second grey-scale shade represent less than half of a full set of lateral wells can be planned from a valid pixel position for a surface pad location.

7. The method of claim 1, further comprising:
    a) determining a position for each pixel within a predetermined surface pad outline centered on a pixel in the area of interest;
    b) determining if each pixel position within the predetermined surface pad outline is valid;
    c) assigning one of a fourth color and a fourth grey-scale shade to each pixel in the predetermined surface pad outline subject to another invalid pixel position, the fourth color and the fourth grey-scale shade representing the predetermined surface pad outline cannot be centered on the pixel in the area of interest; and
    d) repeating steps a)-c) for each pixel in the area of interest.

8. The method of claim 1, further comprising assigning one of a fourth color and a fourth grey-scale shade to each pixel subject to the respective value, the fourth color and the fourth grey-scale shade representing no lateral wells can be planned from a valid pixel position for a surface pad location.

9. A non-transitory program carrier device tangibly carrying computer-executable instructions for creating a platform positioning map for validating a current surface pad location and determining the suitability of another surface pad location, the instructions being executable to implement:
    determining a position for each pixel in an area of interest;
    determining if each pixel position is valid;
    assigning one of a first color and a first grey-scale shade to each pixel subject to an invalid pixel position, the first color and the first grey-scale shade representing an invalid position for a surface pad location where drilling cannot be conducted without at least one of a surface constraint and a subsurface constraint;

calculating a value for each pixel with a valid pixel position;

assigning one of a second color and a second grey-scale shade to each pixel subject to the respective value, the second color and the second grey-scale shade representing at least (1) lateral well but less than a full set of lateral wells can be planned from a valid pixel position for a surface pad location; and assigning one of a third color and a third grey-scale shade to each pixel subject to the respective value, the third color and the third grey-scale shade representing a full set of lateral wells can be planned from a valid pixel position for a surface pad location.

10. The program carrier device of claim 9, further comprising:
displaying each pixel in the area of interest; and
validating a current surface pad location using the display of each pixel.

11. The program carrier device of claim 9, further comprising:
displaying each pixel in the area of interest; and
determining a suitability of another surface pad location using the display of each pixel.

12. The program carrier device of claim 9, wherein the value for each pixel assigned the one of a third color and a third grey-scale shade is one of at least (1) and at least 50%.

13. The program carrier device of claim 9, wherein the value for each pixel assigned the one of a second color and a second grey-scale shade is one of less than (1) and less than 50%.

14. The program carrier device of claim 13, wherein the value for each pixel assigned the one of a second color and a second grey-scale shade is less than 50%, and the second color and the second grey-scale shade represent less than half of a full set of lateral wells can be planned from a valid pixel position for a surface pad location.

15. The program carrier device of claim 9, further comprising:
a) determining a position for each pixel within a predetermined surface pad outline entered on a pixel in the area of interest;
b) determining if each pixel position within the predetermined surface pad outline is valid;
c) assigning one of a fourth color and a fourth grey-scale shade to each pixel in the predetermined surface pad outline subject to another invalid pixel position, the fourth color and the fourth grey-scale shade representing the predetermined surface pad outline cannot be centered on the pixel in the area of interest; and
d) repeating steps a)-c) for each pixel in the area of interest.

16. The program carrier device of claim 9, further comprising assigning one of a fourth color and a fourth grey-scale shade to each pixel subject to the respective value, the fourth color and the fourth grey-scale shade representing no lateral wells can be planned from a valid pixel position for a surface pad location.

17. A non-transitory program carrier device tangibly carrying computer-executable instructions for creating a platform positioning map for validating a current surface pad location and determining the suitability of another surface pad location, the instructions being executable to implement:

determining a position for each pixel in an area of interest;

assigning one of a first color and a first grey-scale shade to each pixel subject to an invalid pixel position, the first color and the first grey-scale shade representing an invalid position for a surface pad location where drilling cannot be conducted without at least one of a surface constraint and a subsurface constraint;

calculating a value for each pixel with a valid pixel position;

assigning one of a second color and a second grey-scale shade to each pixel subject to the respective value, the second color and the second grey-scale shade representing at least (1) lateral well but less than a full set of lateral wells can be planned from a valid pixel position for a surface pad location;

assigning one of a third color and a third grey-scale shade to each pixel subject to the respective value, the third color and the third grey-scale shade representing a full set of lateral wells can be planned from a valid pixel position for a surface pad location; and displaying each pixel in the area of interest.

18. The program carrier device of claim 17, further comprising one of:
validating a current surface pad location using the display of each pixel; and
determining a suitability of another surface pad location using the display of each pixel.

19. The program carrier device of claim 17, wherein the value for each pixel assigned the one of a third color and a third grey-scale shade is one of at least (1) and at least 50%.

20. The program carrier device of claim 17, wherein the value for each pixel assigned the one of a second color and a second grey-scale shade is one of less than (1) and less than 50%.

* * * * *